June 8, 1943. E. L. ROCQUIN 2,321,246
RAKE
Filed Aug. 28, 1942
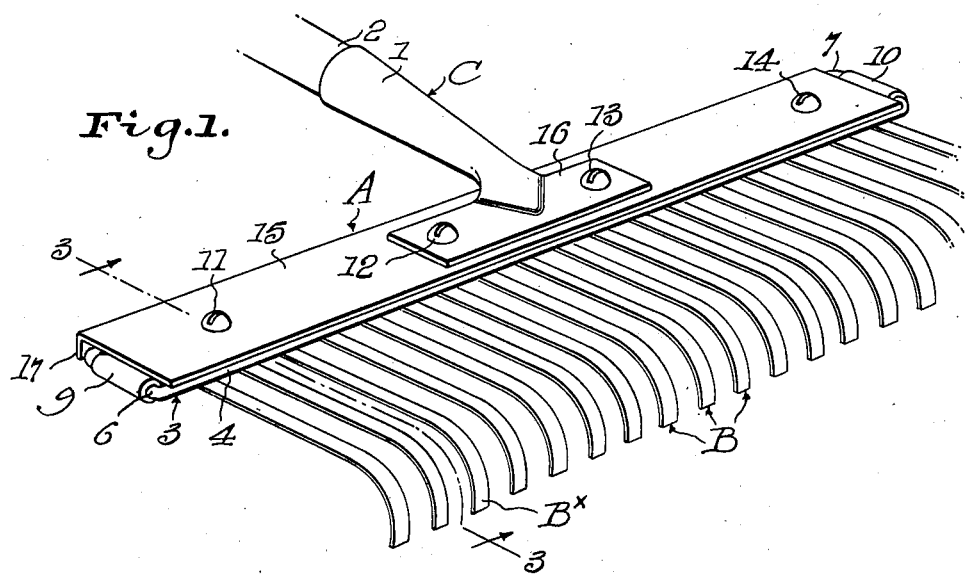
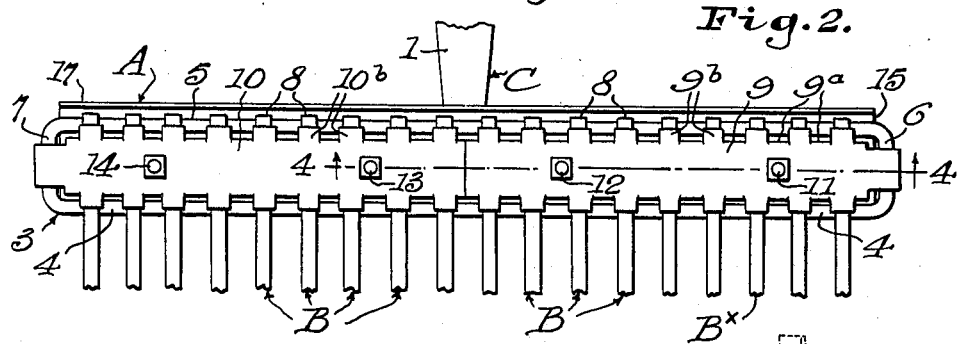
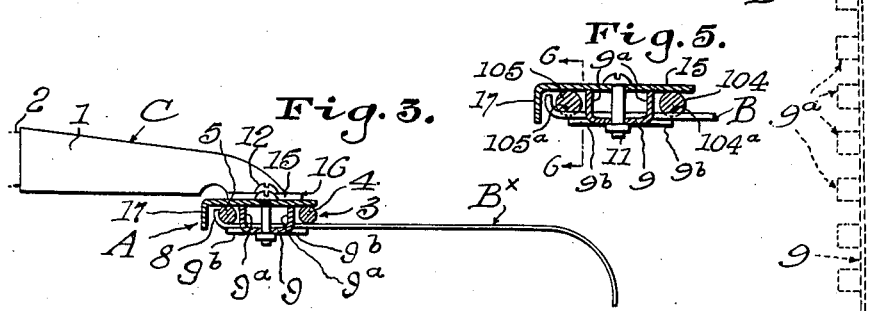
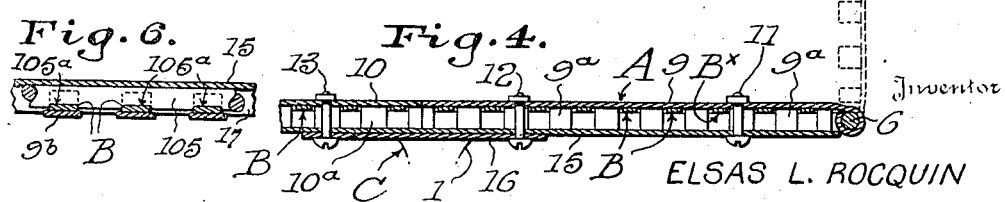
Inventor
ELSAS L. ROCQUIN
Baldwin & Wight
Attorneys Patented June 8, 1943

2,321,246

UNITED STATES PATENT OFFICE 2,321,246

RAKE

Elsas L. Rocquin, New Orleans, La.

Application August 28, 1942, Serial No. 456,544

12 Claims. (Cl. 56—400)

This invention relates to rakes and more particularly rakes equipped with replaceable teeth or tines. The invention can be embodied to particular advantage in rakes having resilient teeth or tines, but is not necessarily limited in its application to rakes of this character.

A very popular and useful rake of a known class comprises a plurality of preferably resilient tines or teeth secured together or to a common mounting frame. If used roughly or for too heavy work, one or more of the tines may become damaged. It heretofore has been proposed to so construct rakes of this class that one or more damaged tines may be removed from the mounting frame and replaced by a new tine or tines.

An object of the present invention is to provide a rake of the character referred to comprising new and improved means for mounting the tines or teeth so as to permit their being easily removed individually for replacement or repair.

Another object is to provide a rake of the kind referred to including a frame to which the tines may be secured in properly spaced or deployed relationship by a very readily removable or releasable holding or locking member.

A further object is to provide a rake of the character stated which is of simple and strong construction and in which the manipulaiton of the parts for releasing and securing the tines can be accomplished without the use of any special tools and without requiring any particular skill.

Other objects will become apparent from a reading of the following detailed description, the appended claims, and the accompanying drawing in which:

Figure 1 is a perspective view of a rake embodying the invention;

Figure 2 is a fragmentary bottom plan view;

Figure 3 is a section on the line 3—3 of Figure 1;

Figure 4 is a section on the line 4—4 of Figure 2;

Figure 5 is a fragmentary detail sectional view of a modification drawn on an enlarged scale; and Figure 6 is a section on the line 6—6 of Figure 5.

The rake shown as embodying the invention in one preferred form comprises a frame or support generally designated A, a plurality of resilient tines B mounted in spaced relation on the frame or support A, and a handle member C secured to the frame or support A. The handle member may be formed to include a socket portion 1 adapted to receive the usual handle 2.

The frame A includes a base member 3 formed as an elongated substantially rectangular loop having front and rear portions 4 and 5 respectively and end portions 6 and 7. The tines B extend transversely across the front and rear portions 4 and 5 and have their rear ends curved transversely to the plane of the loop member 3 as at 8 to fit against the rearmost surface of the loop rear portion 5, and means is provided for releasably clamping the tines against the loop member 3.

In accordance with the invention this clamping means comprises at least one, or as shown, two clamping or locking members 9 and 10 hinged respectively to the ends 6 and 7 of the loop member 3 to swing about axes parallel to the plane of the base member 3. The locking members 9 and 10 are formed respectively with spaced ears 9ª and 10ª projecting transversely to the plane of members 9 and 10 to serve as spacers for positioning the tines B. Flat portions 9ᵇ and 10ᵇ formed on the members 9 and 10 and intervening between adjacent ears 9ª and 10ª, extend over the front and rear loop portions 4 and 5 so as to press the tines directly against the portions 4 and 5 without springing or bowing the tines between the portions 4 and 5.

For securing or clamping the locking members 9 and 10 in their tine-holding positions, bolts 11, 12, 13, and 14 extend through the locking members and through a plate 15 on the top face of the loop member 3. Preferably the bolts 12 and 13 also pass through a pad 16 formed as part of the handle member C. The plate C preferably is formed with a flange 17 extending over the curved rear ends 8 of the tines B.

Normally the bolts 11, 12, 13, and 14 hold the locking plates 9 and 10, the tines B, the loop member 3, the plate 15, and the handle member C all rigidly secured together in parallelism as a unit. If one of the tines, say the tine marked Bˣ in Figures 1, 2 and 3 should become damaged, it may be released for being replaced by simply removing the nuts from the bolts 11 and 12 and then swinging the locking plate 9 about its hinge to the position shown in dotted lines in Figure 4 or to some intermediate position between the full line and dotted line positions. The damaged tine may then be removed and a new one substituted, after which the locking plate 9 is returned to its normal position. Any damaged tine held by the locking plate 10 may be released similarly by swinging the plate 10 away from the loop member 3.

It will be observed that by using two locking plates 9 and 10 and by hinging them to the member 3, provision is made for holding most of the parts assembled during the replacement of a damaged tine. Thus, only one-half of the tines will be released when one of the locking plates is swung away from the member 3, and the handle C, plate 15, loop member 3, one of the locking plates, and one-half of the tines will always be rigidly secured together. The clamping members 9 and 10, although movably mounted on the base member 3, are permanently connected thereto. The only parts which might be lost easily are the bolts 11, 12, 13 and 14 and their nuts, and these, being common hardware parts, could be replaced easily.

As shown in Figures 5 and 6, the loop member may include front and rear portions 104 and 105 formed respectively with aligned notches or seats 104a and 105a adapted to receive the tines B for assisting in maintaining the tines against displacement longitudinally of the frame.

The rake disclosed herein embodies the invention in the form now preferred, but it will be understood that changes may be made without departing from the invention as defined in the claims.

I claim:

1. In a rake, a frame, and a plurality of tines mounted on the frame for individual removal therefrom, said frame including a base member, a clamping member, a hinge connection between said clamping member and said base member the axis of said hinge connection being parallel to the plane of said base member whereby said clamping member can be moved to one position for clamping said tines to said base member and to another position for releasing said tines, and means for releasably holding said clamping member in said one position.

2. In a rake, a frame, and a plurality of tines deployed longitudinally of the frame, said frame including a base member, a clamping member extending longitudinally of the frame, means hinging said clamping member to said base member to pivot thereon about an axis parallel to the plane of the base member whereby said clamping member can be moved to one position for clamping said tines to said base member and to another position for releasing said tines, and means for releasably holding said clamping member in said one position.

3. In a rake, a frame, and a plurality of tines deployed longitudinally of the frame, said frame including a base member, two clamping members extending longitudinally of the frame and each about one half the length of the frame, means hinging said clamping members to said base member respectively at opposite ends thereof to pivot on said base member about axes parallel to the plane of said base member whereby said clamping members can be moved respectively to positions for clamping said tines to said base member and to other positions for releasing said tines, and separate means for individually and releasably holding said clamping members respectively in tine-clamping positions.

4. Rake structure as set forth in claim 1 in which the clamping member is formed with ears spaced longitudinally of the frame and between which the tines extend for being held in spaced relation.

5. Rake structure as set forth in claim 3 in which the clamping members are formed with ears spaced longitudinally of the frame and between which the tines extend for being held in spaced relation.

6. In a rake, a frame, and a plurality of tines deployed longitudinally of the frame, said frame comprising a base member formed as an elongated substantially rectangular loop, two clamping members extending longitudinally of the frame and each about one half the length of the frame, means mounting said clamping members to pivot respectively about the opposite ends of said base member whereby said clamping members can be moved respectively to positions for clamping said tines to said base member and to other positions for releasing said tines, and separate means for individually and releasably holding said clamping members respectively in tine-clamping positions.

7. Rake structure as set forth in claim 6 in which the clamping members are formed respectively along their front and rear edges with spaced ears which extend at an angle to the plane of the base member and between the tines when the clamping members are in clamping position to thereby hold the tines deployed longitudinally of the frame.

8. Rake structure as set forth in claim 6 in which the tines extend from in front of the frame rearwardly across the front and rear parts of the loop forming said base member and have their rear end portions extending transversely to the plane of said loop to lie behind and in contact with the rear part of the loop.

9. In a rake, a base member formed as an elongated, substantially rectangular loop, a plurality of tines deployed longitudinally of the loop and extending transversely across it, two clamping members hinged respectively to opposite ends of the loop and being adapted to be folded down in parallelism with and over the loop to clamp the tines to the loop and being adapted also to be swung out of clamping position to release said tines, a plate in parallelism with said loop and engaging the latter on the face thereof opposite the face on which said clamping members are positioned, and means for releasably drawing said clamping members and said plate toward said base member for locking said tines to said base member.

10. Rake structure as set forth in claim 9 in which the plate is formed along its rear edge with a flange projecting behind the rear ends of the tines.

11. A structure as set forth in claim 1 in which the base member is provided with longitudinally spaced seats receiving the tines respectively.

12. A structure as set forth in claim 9 in which the portions of the loop extending longitudinally of the base member are formed with spaced seats receiving the tines respectively.

ELSAS L. ROCQUIN